No. 796,465.

PATENTED AUG. 8, 1905.

C. B. STEPHEN.
UTENSIL HANDLE.
APPLICATION FILED FEB. 20, 1905.

Witnesses

Cyrus B. Stephen,
Inventor.
by
Attorneys

UNITED STATES PATENT OFFICE.

CYRUS B. STEPHEN, OF REDKEY, INDIANA.

UTENSIL-HANDLE.

No. 796,465. Specification of Letters Patent. Patented Aug. 8, 1905.

Application filed February 20, 1905. Serial No. 246,556.

*To all whom it may concern:*

Be it known that I, CYRUS B. STEPHEN, a citizen of the United States, residing at Redkey, in the county of Jay and State of Indiana, have invented a new and useful Utensil-Handle, of which the following is a specification.

This invention relates to handles or bails for kettles of various kinds and similar utensils, and has for its object to provide a simply-constructed device whereby the bail or handle will remain in whatever position it may be placed.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
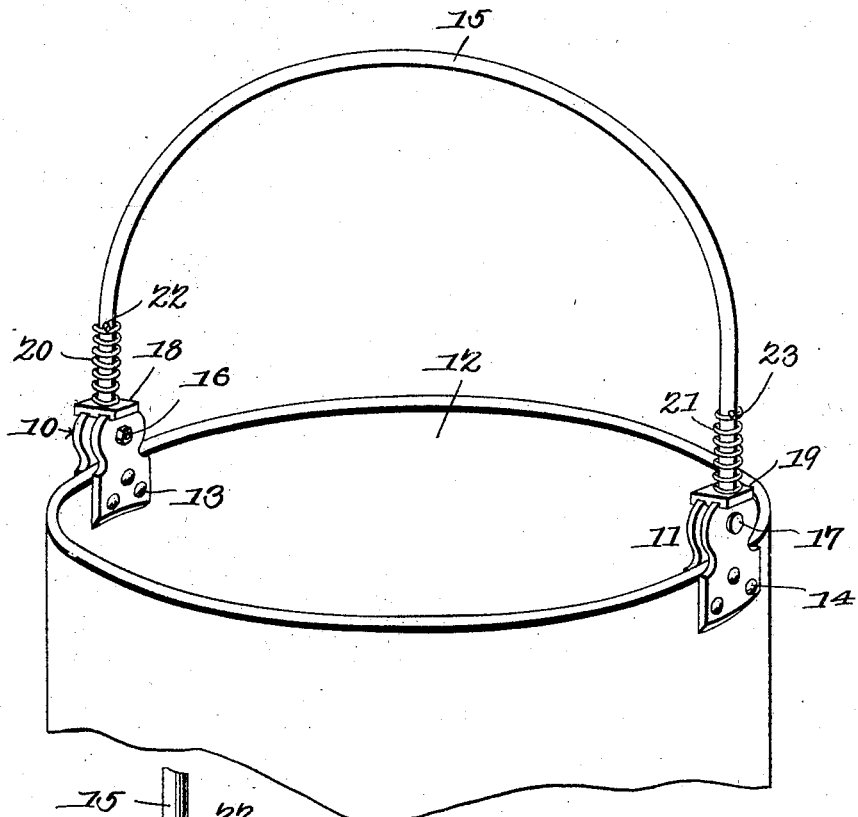
Figure 2:
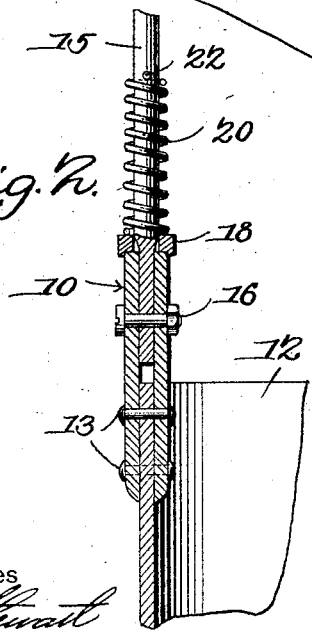
Figure 3:
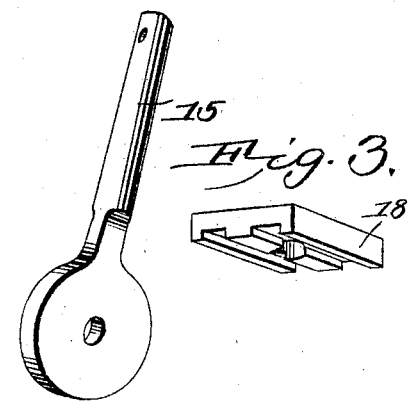

In the drawings, Figure 1 is a perspective view of a portion of a kettle with the improvement applied. Fig. 2 is a sectional view, enlarged, of one side of the same. Fig. 3 shows perspective views of a portion of the bail and one of the clamp-plates.

The improved device comprises ears 10 11, preferably arranged in pairs spaced apart and connected to the rim of the utensil, (represented at 12,) as by rivets 13 14 or by other means. The ears are segmental in outline, and the bail 15 is pivoted by its ends, as at 16 17, centrally of the segmental ears, the bail ends being enlarged into disks, as shown in Fig. 3, where they come between or against the ears to in-increase the bearing-surface, and thus correspondingly increase the grip or tension between the parts. Slidably disposed upon the bail 15 are plates 18 19, bearing upon the segmental surfaces of the ears and provided with spaced ribs on their lower surfaces for bearing upon the sides of the ears to increase the frictional surface. Coiled around the bail and bearing upon the plates 18 19 are springs 20 21, the springs limited in upward movement, as by transverse pins 22 23. By this simple arrangement it will be obvious that the plates will be held by the full force of the springs against the ears and produce a brake-like action and support the bail 15 at any point relative to the ears or the rim of the utensil into which it may be moved.

The device may be readily adapted to any form of kettle or similar utensil having bail-like handles and will be found very convenient and useful in culinary operations, as will be obvious.

Having thus described the invention, what is claimed is—

1. A utensil having ears extending from the rim, a bail pivoted to swing from said ears, plates carried by said bail and bearing upon said ears, and springs carried by said bail and bearing upon said plates.

2. A utensil having ears extending from the rim, a bail pivoted to swing from said ears, plates slidable upon said bail and bearing upon said ears, and springs coiled about said bail and connected thereto and bearing upon said plates.

3. A utensil having ears extending from the rim, a bail pivoted to swing from said ears, plates upon said bail and bearing upon said ears, and springs connected to said bail and bearing upon said plates.

4. A utensil having segmental ears extending from the rim, a bail pivoted to swing centrally from said ears, plates slidable upon said bail and bearing upon said plates, and springs carried by said bail and bearing upon said plates.

5. A utensil having segmental ears extending from the rim, a bail pivoted to swing centrally from said ears, plates slidable upon said bail and having spaced ribs embracing said ears and bearing thereon, and springs carried by said bail and bearing upon said plates.

In testimony that I claim the foregoing as my own I have hereto affixed my signature in the presence of two witnesses.

CYRUS B. STEPHEN.

Witnesses:
OLIVER P. MARTIN,
SAMUEL MURPHY.